Inventor
Ernest G. Johansson
by Roberts, Cushman & Grover
att'ys.

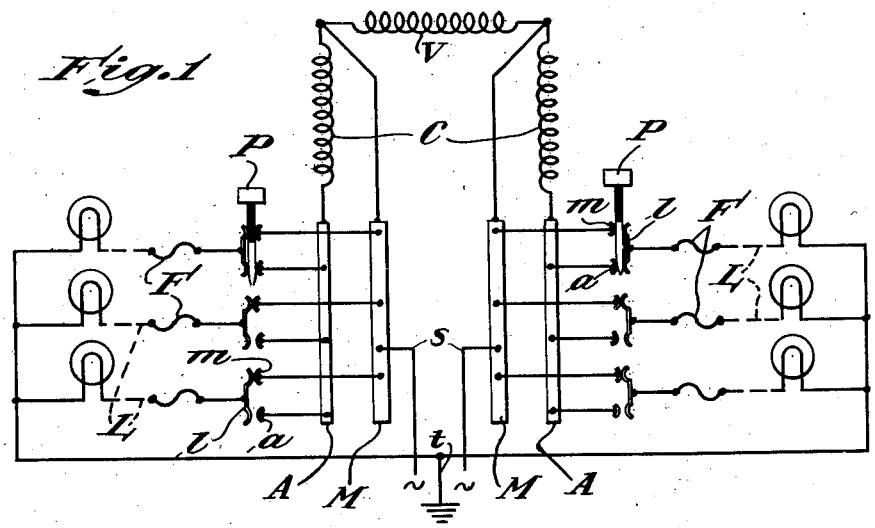
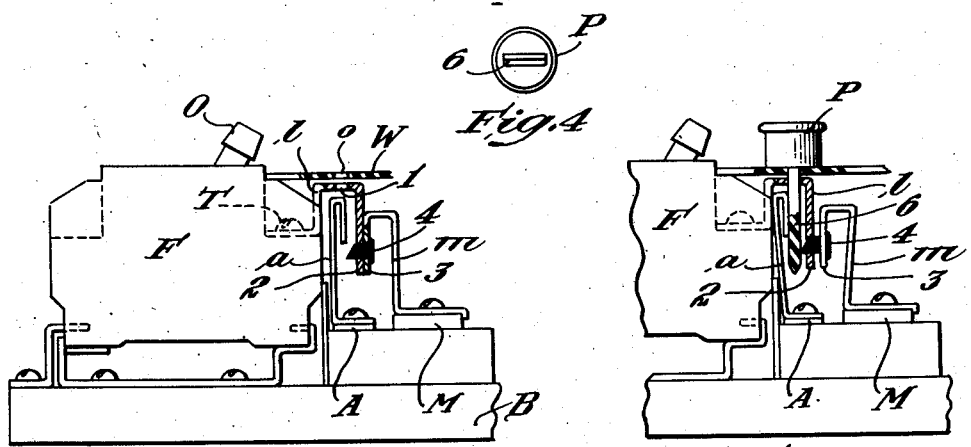
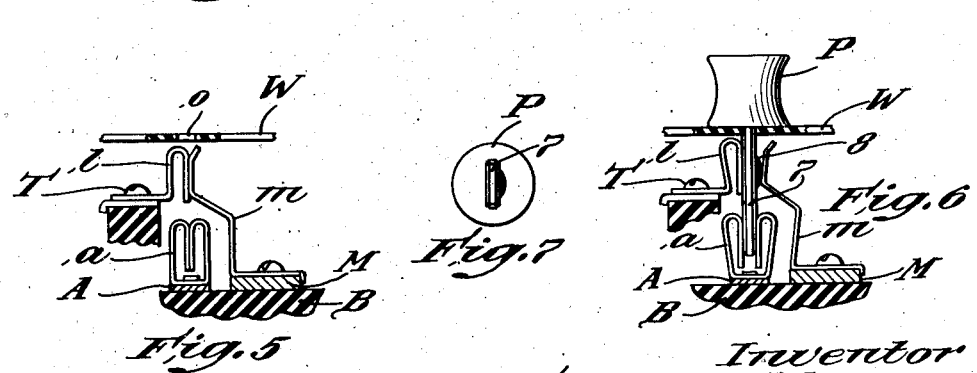

June 21, 1949. E. G. JOHANSSON 2,473,685
CURRENT DISTRIBUTION PANEL
Filed Aug. 26, 1944 3 Sheets-Sheet 3

Inventor
Ernest G. Johansson
by Roberts, Cushman & Groover
att'ys.

Patented June 21, 1949

2,473,685

UNITED STATES PATENT OFFICE 2,473,685

CURRENT DISTRIBUTION PANEL

Ernest G. Johansson, Belmont, Mass., assignor to Anchor Manufacturing Company, Boston, Mass., a corporation of Massachusetts Application August 26, 1944, Serial No. 551,372

2 Claims. (Cl. 175—183)

This invention relates to electrical distribution panels such as used in apartment houses and offices for distributing current from a main source of supply to various apartments or offices, and more particularly to panels of the type enclosed in cabinets adapted to be locked. In many cases current is supplied on a flat rate irrespective of the amount of current used and in such cases it is customary to connect a meter in each circuit periodically to determine the approximate amount each customer is using. One way of making this check has been to provide means for plugging a meter into each circuit. It has also been proposed to connect a single meter in any one of the circuits by means of flexible leads connected between terminal posts normally bridged by links. For various reasons neither of these prior checking methods has been satisfactory.

Objects of the present invention are to provide a distribution panel which permits each load circuit to be checked quickly and easily without danger to the operator, which permits checking by a janitor or other unskilled operator, which avoids all danger of sparking in closing and opening the checking circuits, and to produce a panel which is simple and economical in construction, which has no screws or the like to manipulate in the checking operations, which is durable and reliable in use and which is generally superior to prior distribution panels.

According to the present invention the panel comprises a row of fuses or other circuit breakers for the different load circuits respectively, main and auxiliary bus bars or other supply conductors extending along the aforesaid row for connecting one side of the supply circuit to corresponding sides of the load circuits, means for connecting the current coil of the meter between the supply conductors, a set of main and auxiliary switches for selectively connecting each load circuit to said main and auxiliary supply conductors respectively, each main switch being normally closed and each auxiliary switch being normally open, and means for actuating each of said sets of switches conjointly to close the auxiliary switch first and then open the main switch, whereby the current to the load circuit is not interrupted when cutting the meter coil in or out of circuit. While the panel may be in the form of an uncovered switch board it is preferably in the form of a cabinet having a cover which may be locked.

Preferably the switching means includes main and auxiliary contacts connected to the main and auxiliary conductors and a load contact for connecting the load circuit either with the main contact or with the auxiliary contact, the load contact being normally connected with the main contact, and actuating means for successively connecting the load contact with the auxiliary contact and then disconnecting it from the main contact. In the preferred embodiment the load contact is movable from a main position where it contacts only the main contact through a mid position where it engages both the other contacts to an auxiliary position where it engages only the auxiliary contact.

In a still more specific aspect of the invention the supply conductors and switches are located in an isolated compartment of the cabinet having restricted openings in its wall adjacent to the aforesaid sets of switches respectively, the switches being arranged to be actuated by a plug inserted through these openings.

For the purpose of illustration typical embodiments of the invention are shown in the accompanying drawings in which Fig. 1 is a circuit diagram;

Fig. 2 is a sectional view of one embodiment in normal position;

Fig. 3 is a similar section showing the switch-actuated plug inserted;

Fig. 4 is an end view of a switch-actuated plug suitable for use in the embodiment shown in Figs. 2 and 3;

Figs. 5, 6 and 7 are views similar to Figs. 2, 3 and 4 showing another embodiment;

Figure 8:
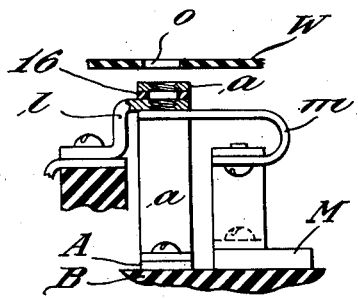
Figs. 8, 9 and 10 are similar views showing a further embodiment.

In the circuit diagram shown in Fig. 1, M are the main bus bars, A the auxiliary bus bars, P the switch-actuating plugs, F the fuses or other circuit breakers, L the load circuits leading to the various apartments, $m$ the contacts of the switches connected to the main bus bar, $a$ the contacts of the switches connected to the auxiliary bus bars, $l$ the contacts of the switches connected to the load circuits, C the current coils of a wattmeter, and V the potential coil of the wattmeter. The main bus bars M are connected to the two sides $s$ respectively of a three-wire circuit, the third side $t$ being grounded as usual. The particular plug P shown in Fig. 1 comprises a blade the lower end of which is conducting and the upper end of which is insulating. Normally the load contacts $l$ engage the main contacts $m$ but are disengaged from the auxiliary contacts $a$. Thus the current flows from the main bus bar M through the contacts $m$ and $l$ to the load circuits. When the plug P is first inserted it separates contacts $l$ and $m$ but current continues to flow between these contacts through the conductive portion of the plug. When the plug reaches the position shown at the right-hand side of Fig. 1 it bridges the space between contacts $a$ and $l$ so that current can flow through these contacts and also through the contacts $m$ and $l$. When the plug is fully inserted to the position shown at the left of Fig. 1 the insulating portion of the plug lies between the contacts $l$ and $m$ so that current can only flow between contacts $a$ and $l$. In this fully-inserted position all current to the load circuit must therefore flow through the current coil of the meter. Consequently the meter will continue to measure the current consumption so long as the plug remains in this position. The meter may be permanently connected to the bus bars or it may be of the type adapted to be plugged into sockets which are connected to the bus bars.

Referring now to the various switch constructions shown in Figs. 2 to 18 inclusive for purpose of illustration, in these figures the parts corresponding to A, F, M, P, $a$, $l$ and $m$ in Fig. 1 are correspondingly designated. Moreover the circuit breakers F are shown in the form of the well-known over-loads type in which the operating part O is kicked from closed to open position by an over-load and must then be returned to closed position by hand. In each of the figures the back of the panel or cabinet is indicated at B and the front wall at W, the latter containing openings $o$ through which the plugs P are inserted. In each figure the load contact $l$ is mounted on one terminal T of the circuit breaker F, the main contact $m$ is mounted on the main bus bar M and the auxiliary contact $a$ is mounted on the auxiliary bus bar A.

In Figs. 2, 3 and 4 the load contact $l$ has an opening $1$ in line with the opening $o$ and it has a depending portion 2 normally engaging flatwise with a depending portion 3 of the main contact $m$. The main contact $m$ carries a plug 4 of insulation material which projects through an opening in the depending portion 2 of the load contact $m$ with a beveled end in line with the openings $o$ and $1$. The auxiliary contact $a$ has an upstanding portion, the upper end of which is folded over to present a rounded surface to the opening $1$. The contact $a$ is offset somewhat to the left of the opening $1$ so that when the plug P is inserted the contact is moved from the normal position shown in Fig. 2 into contact with the load contact $l$ as shown in Fig. 3. The plug P also engages the insulating plug 4 to move the main contact $m$ out of conducting relation with the load contact $l$. Inasmuch as the plug 4 is well below the upper end of the contact $a$, the main contact $m$ is not moved away from the load contact $l$ until after the auxiliary contact $a$ has been moved into engagement with the load contact. In this embodiment of the invention the blade 6 of plug P may be either conducting or non-conducting but it is preferably made of insulation such as Bakelite.

In the embodiment shown in Figs. 5, 6 and 7 the main contact $m$ engages the load contact $l$ in line with the opening $o$ in the wall W so that when the plug P is inserted through the opening the two contacts are moved apart. The auxiliary contact $a$ has two inturned ends meeting each other in line with the opening $o$ so that the lower end of the blade enters between these two ends as shown in Fig. 6. The blade 7 of plug C is formed of conducting material and carries an insulation plug 8 which holds the main contact $m$ out of conducting relation with the blade when the plug is fully inserted to the position shown in Fig. 6. As shown in Fig. 5 the main contact $m$ normally engages the load contact $l$ and the auxiliary contact $a$ engages neither of the other two contacts. When the plug P is first inserted the blade 7 moves the contacts $l$ and $m$ apart but the current continues to flow between the contacts through the conducting blade. When the lower end of the blade reaches the auxiliary contact $a$ current may flow between contacts $a$ and $l$ through the blade while still flowing through the blade between $l$ and $m$. However when the plug is fully inserted contact $m$ is moved out of conducting relation to the other contacts by insulation plug 8, while the blade still bridges the contacts $a$ and $l$.

Figure 10:
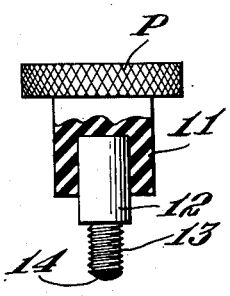
Figure 9:
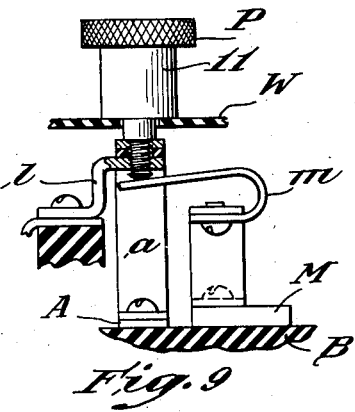

In Figs. 8, 9 and 10 the plug C has an insulation portion 11, a conducting portion 12 having a reduced threaded end 13 and an insulating tip 14. The upper end of the auxiliary contact $a$ is bent over the load contact $l$ and the two contacts have openings aligned with the opening $o$ to receive the plug P, the openings being threaded to receive the threaded portion 13 of the plug. Mounted between the overlapping portions of the contacts $a$ and $l$ is an insulation piece 16 which has an opening somewhat larger than those in $a$ and $l$. Normally the main contact $m$ presses upwardly against the load contact $l$ to establish conducting relationship between the two contacts. In threading the plug P into the contacts $a$ and $l$ the conducting portion 13 establishes conducting relationship between the two contacts as soon as the plug enters the opening in $l$. Then when the tip of the plug emerges from the opening in $l$ the insulating tip 14 interrupts the conducting relationship between $l$ and $m$. When the plug is fully inserted the shoulder at the lower end of the conducting portion 12 seats on the upper side of contact $a$ to establish good contact.

Figure 11:
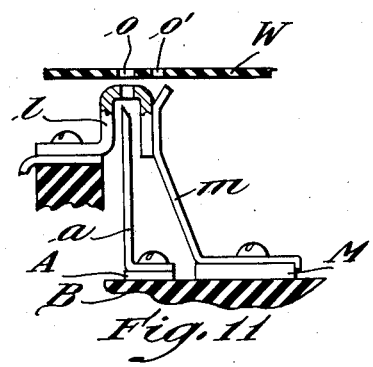
Figs. 11, 12 and 13 are similar views showing still another embodiment.
Figure 13:
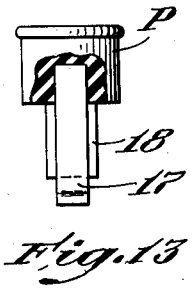
Figure 12:
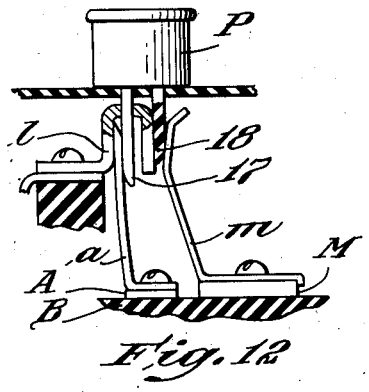

In Figs. 11, 12 and 13 the plug has two blades, a conducting blade 17 and an insulating blade 18, the conducting blade being longer but the insulation blade being wider. Normally the contacts occupy the position shown in Fig. 11 where $l$ engages $m$ but $a$ engages neither of the other contacts. The slots $o$ and $o'$ are shaped to receive the blades 17 and 18 respectively. By making the slot $o$ too short to receive the wider insulating blade 18 the plug can be inserted only one way. By making the conducting blade 17 longer it pushes the auxiliary contact $a$ into engagement with the load contact $l$ before the insulating blade 18 separates contacts $l$ and $m$.

Figure 14:
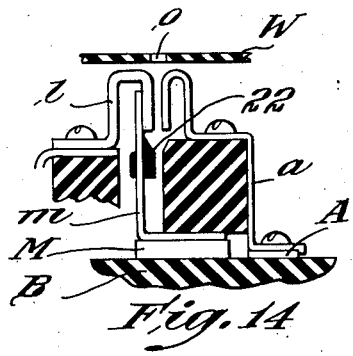
Figs. 14, 15 and 16 are similar views showing another modification.
Figure 16:
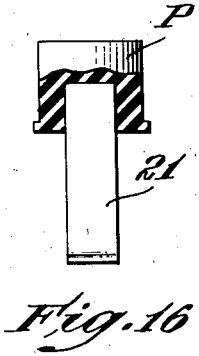
Figure 15:
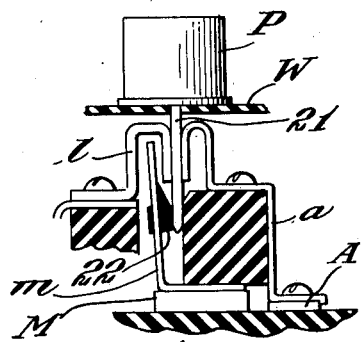

In Figs. 14, 15 and 16 the blade 21 of the plug is formed of conducting material and an insulating piece 22 is mounted on the main contact $m$, this piece having an inclined upper surface in line with the opening $o$. Normally the main contact $m$ engages load contact $l$, with the auxiliary contact $a$ out of engagement with the other contacts, as shown in Fig. 14. When the plug is inserted the conducting blade 21 first establishes conducting relationship between $a$ and $l$, after which the main contact $m$ is pushed out of engagement with the load contact $l$ by the engagement of the blade with the insulating piece 22.

Figure 17:
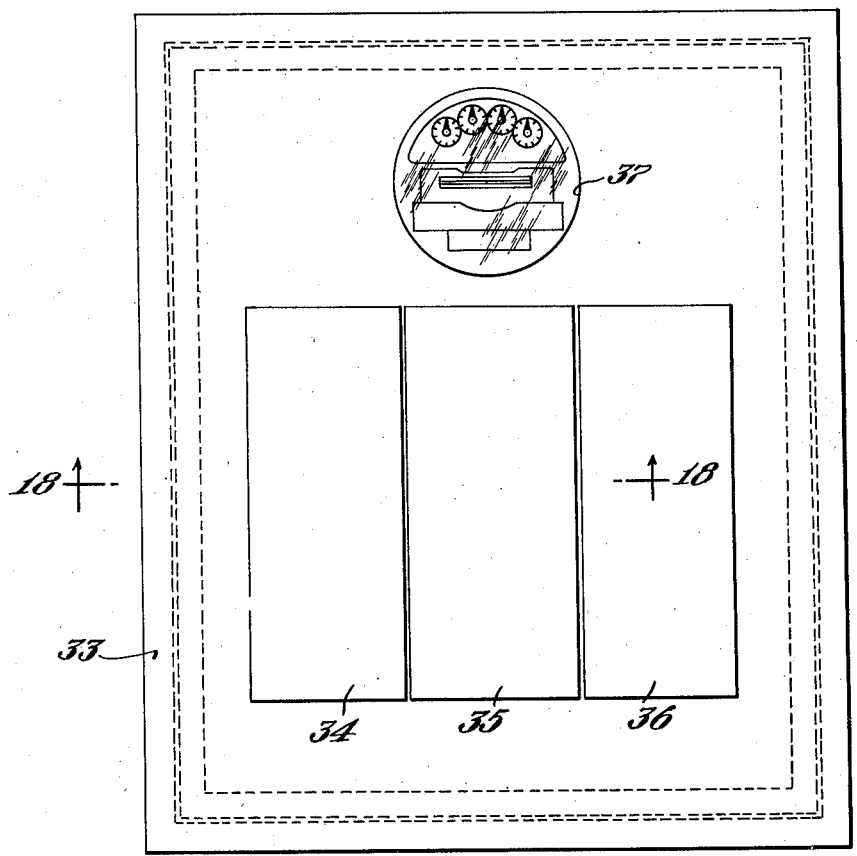
Fig. 17 is a front view of a typical cabinet.
Figure 18:
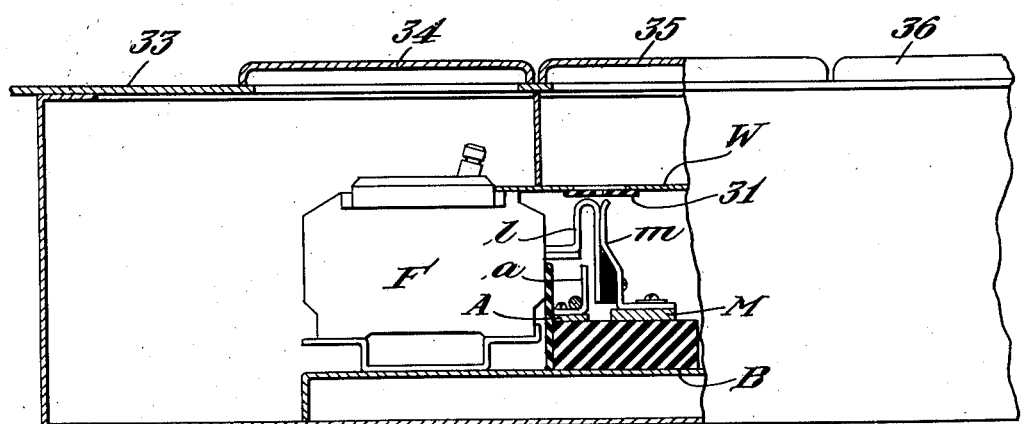
Fig. 18 is a section on line 18—18 of Fig. 17.

In Figs. 17 and 18 the construction is similar to that shown in Figs. 14 to 16. When the conducting blade is inserted it affords a conducting path between $m$ and $l$ while pushing $l$ against $a$ and then, through the medium of an insulation piece on $m$, breaks contact between $m$ and $l$. In Figs. 17 and 18 the wall W is formed of metal with a large opening for the plug and a piece of insulation 31 is mounted over the opening with a smaller opening to fit the blade of the plug. However it will be understood that the wall may be formed of insulation as in the other figures, and conversely that the wall arrangement of Figs. 17 and 18 may be substituted in the other figures.

The cabinet of Figs. 17 and 18 comprises a rear wall 32 carrying the base B, a front wall 33 having three doors 34, 35 and 36 and a meter opening 37. Partitions between the doors divide the cabinet into a central compartment containing the checking switches and side compartments containing the circuit breakers. While each of the doors may be locked or sealed, ordinarily it is preferable to leave the two side doors 34 and 36 unlocked for access to the circuit breakers. The meter may be permanently mounted in opening 37 or it may be of the plug-in type. Instead of having only a single meter any desired number of meters may be provided for checking a plurality of circuits simultaneously.

It should be understood that the present disclosure is for the purpose of illustration only and that this invention includes all modifications and equivalents which fall within the scope of the appended claims.

I claim:

1. A distribution meter panel for normally feeding a plurality of load circuits directly from a supply circuit and for selectively diverting without interruption any one of the load circuits through the meter of the panel, said panel comprising a series of switches each switch having a main supply contact, an auxiliary supply contact, and a load contact; a main bus having a supply terminal for connection to one side of said supply circuit the other side of which is connected to said load circuits, means for connecting it to one terminal of a coil of said meter, and connections to said main supply contacts; an auxiliary bus having means for connecting it to the other terminal of said coil, and connections to said auxiliary contacts; a plurality of terminal means for connection to said load circuits, each terminal means being connected to a respective one of said load contacts; and switch actuating means for connecting the load contact of a selected switch to either its main or auxiliary supply contact or to both main and auxiliary contacts, said actuating means being movable from a position in which only load and main supply contacts are connected, through an intermediate position in which all three contacts are connected, to a position in which only load and auxiliary supply contacts are connected whereby, by moving said actuating means, said coil may be included in and removed from any one of said load circuits without interrupting the connection between load and supply circuits.

2. A distribution meter panel for normally feeding a plurality of load circuits directly from a supply circuit and for selectively diverting without interruption any one of the load circuits through the meter of the panel, said panel comprising a series of switches each switch having a main supply contact, an auxiliary contact, and a load contact normally contacting said main supply contact but normally disconnected from said auxiliary supply contact; a main bus having a supply terminal for connection to one side of said supply circuit the other side of which is connected to said load circuits, a connection to one terminal of a coil of said meter, and connections to said main supply contacts; an auxiliary bus having a connection to the other terminal of said coil, and connections to said auxiliary contacts; a plurality of terminal means for connection to said load circuits, each terminal means being connected to a respective one of said load contacts; and a switch actuating removable plug for connecting the load contact of a selected switch to either its main or auxiliary supply contacts or to both main and auxiliary supply contacts, said plug when removed permitting said normal contacting of all main supply and load contacts and when inserted in a selected switch first establishing said connection between all three contacts of said switch and then disconnecting said main supply contact from said load contact but establishing connection between said load and auxiliary contacts of the switch.

ERNEST G. JOHANSSON.

REFERENCES CITED

The following references are of record in the file of this patent:

UNITED STATES PATENTS

| Number | Name | Date |
| --- | --- | --- |
| Re. 21,148 | Mylius | July 11, 1939 |
| 393,756 | Griscom | Dec. 4, 1888 |
| 579,473 | Davidson et al. | Mar. 23, 1897 |
| 892,470 | Valkenburg | July 7, 1908 |
| 961,464 | Robinson | June 14, 1910 |
| 977,061 | Wiler | Nov. 29, 1910 |
| 995,627 | Murray | June 20, 1911 |
| 1,099,683 | Adam | June 9, 1914 |
| 1,171,586 | Brown | Feb. 15, 1916 |
| 1,171,587 | Brown | Feb. 15, 1916 |
| 1,197,339 | Brodmann | Sept. 5, 1916 |
| 1,761,638 | Newman | June 3, 1930 |
| 1,950,486 | Frank | Mar. 13, 1934 |
| 1,958,882 | Baxter | May 15, 1934 |